United States Patent [19] | [11] 4,176,479
l'Hoir | [45] Dec. 4, 1979

[54] LABEL OR TAG

[75] Inventor: Paul A. L. l'Hoir, Arnhem, Netherlands

[73] Assignee: B. V. Etikettenfabriek Gebroeders Mogendorff, Zevenaar, Netherlands

[21] Appl. No.: 614,279

[22] Filed: Sep. 17, 1975

[51] Int. Cl.[2] ..................... B32B 3/10; B32B 3/02

[52] U.S. Cl. ..................... 40/2 R; 93/1 G; 93/1 A; 283/18; 428/43; 428/136; 428/138; 428/155; 428/476

[58] Field of Search ..................... 428/192, 43, 136, 137, 428/139, 155, 914, 134, 131, 915, 916; 283/21, 18; 40/2 R, 360, 10 R, 27; 93/58 R, 87, 1 G, 1 R; 156/257, 250

[56] References Cited

U.S. PATENT DOCUMENTS

| | | | |
|---|---|---|---|
| 2,531,631 | 11/1950 | Jordan | 40/2 R |
| 2,699,103 | 1/1955 | Stasikewich | 206/820 |
| 2,845,728 | 8/1958 | Huber | 40/2 R |
| 3,270,872 | 9/1966 | Paxton | 40/2 R |
| 3,703,044 | 11/1972 | Gregory | 40/2 R |
| 3,854,581 | 12/1974 | Jones | 161/406 |
| 3,993,814 | 11/1976 | Cavender | 428/137 |

FOREIGN PATENT DOCUMENTS 7012082 of 1970 Netherlands .

*Primary Examiner*—George F. Lesmes
*Assistant Examiner*—P. Thibodeau
*Attorney, Agent, or Firm*—Norman Friedman; Robert F. Rotella

[57] ABSTRACT

A label manufactured from sheet-shaped material, comprising a first part destined for bearing information and a second part connected with the first part and destined to be secured to an article, characterized in that the second part consists of a strip of sheet-shaped material provided with a plurality of incisions extending substantially in the longitudinal direction.

16 Claims, 4 Drawing Figures

LABEL OR TAG

BACKGROUND AND SUMMARY OF THE INVENTION

The invention relates to a label manufactured from sheet-shaped material, comprising a first part destined for bearing information and a second part connected with the first part destined to be secured to an article.

Such labels are known per se and consist of a strip of rigid paper or cardboard with a string secured thereto by one end, the other end of said strip being attached by means of a metal clip to a package; this clip mostly also serves for closing the package. Also known are the so-called "twin-labels" consisting of two labels interconnected by a string particularly destined to be used in combination with a packing formed of netting. The string is connected in the proximity of the central part thereof by means of two spaced clips to the net, whereafter the string and the net are cut through between the two clips. In this way two labels are simultaneously connected in one single operation.

The known commercially available labels and the conventional way of attaching a label are satisfactory in practice. Since these labels are used in multitudes, the price thereof is a factor of importance. Experiments with labels in which the string was omitted and the sheet-shaped material of the label itself was secured to the packing by means of a clip were not successful, since on applying the clip, the material of the label is often cut through.

It is an object of the invention to provide a label of the aforementioned kind which can be manufactured at a considerably lower price than the known labels and which can be affixed in a dependable way by means of a metal clip to a packing. This object is attained according to the invention by the arrangement that the second part consists of a strip of sheet-shaped material provided with a plurality of incisions extending substantially in the longitudinal direction.

After the label has been applied maybe one of the strips formed by the incisions will be cut through, but it has been found in practice that a sufficient part of the rest remains intact so that the label remains dependably secured to the packing.

Preferably the first and second part are manufactured in one single piece. They may also be formed from synthetic foil reinforced paper.

A label analogous to the aforementioned twin-label is obtained from two labels formed as described hereinbefore and interconnected by their respective fastening parts. Such a twin-label can also be made in one piece.

DETAILED DESCRIPTION OF THE INVENTION

Figure 1:
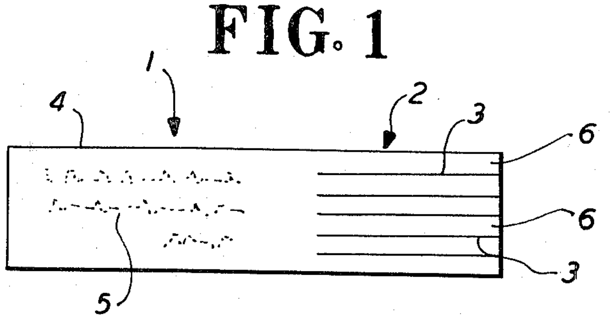
FIG. 1 is a plan view of a so-called duo-label to be affixed to a packing.

As seen in FIG. 1 the label, as a whole denoted by the reference numeral 1, consists of a strip of material, e.g, rigid paper or cardboard, or of a synthetic foil reinforced paper, with a plurality of incisions 3 made in the right hand part 2 thereof. The left hand part 4 bears the text 5. Obviously the label can be printed on both sides, which is also possible when synthetic foil reinforced paper is used if the synthetic foil is disposed between two layers of paper.

Figure 2:
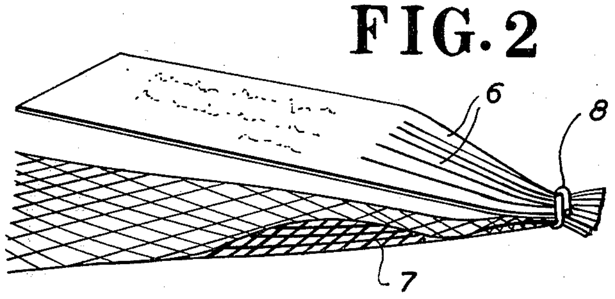
FIG. 2 is a perspective view of a label attached to a packing.

The incisions 3 divide the right hand part into a plurality of strips 6, which, when the label is fixed to the bag-shaped packing (see FIG. 2), are taken together and retained to the packing by the metal clip 8 which is disposed by means of a suitable machine (known per se) about the strips 6 and the packing net bag 7. If one of the strips 6 is cut through when the clip is applied then—as has been found in practice—always one or more of the other strips will remain intact so that the label remains always dependably secured to the packing.

Figure 3:
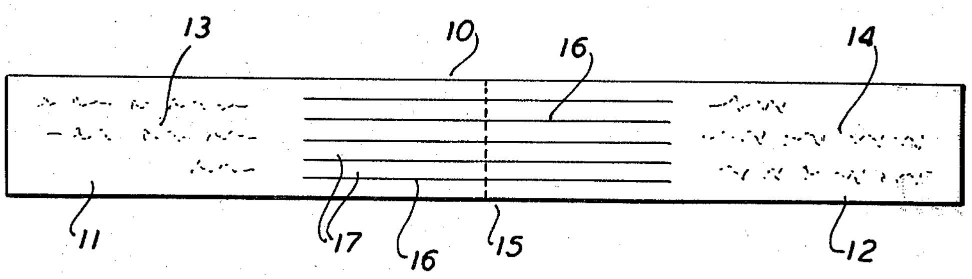
FIG. 3 is a plan view of a so-called duo-label prior to being attached to a packing.

FIG. 3 shows a twin-label, as a whole denoted by the reference numeral 10, and consisting of the two parts 11 and 12 destined for bearing an inscription 13, 14 respectively, and interconnected by a part 15 in which a plurality of parallel longitudinally extending incisions 16 are made. These incisions determine, as is the case with the label according to FIG. 1, a plurality of strips 17.

Figure 4:
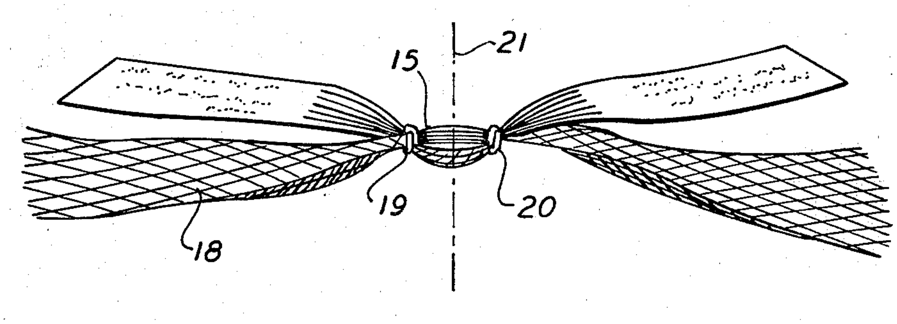
FIG. 4 shows a label according to FIG. 3 and attached to the packing.

FIG. 4 shows how this label is attached in a way known per se to the net bag 18; the part 15 is, in the proximity of the central part thereof, affixed to the net bag by means of two metal clips 19, 20, whereafter the strip 16 and the net bag are cut through between the clips 19 and 20 along the line 21.

Accordingly, the present invention is to be measured solely by the following claims.

What is claimed is:

1. A label or tag comprising an elongated, longitudinally extending strip of sheet material, said strip comprising:
   - a first part adapted to have information marked thereon, said first part having first and second opposite ends, said first end being free and defining the extreme outer longitudinal end of said first part;
   - a second, elongated, longitudinally extending part of substantial length intended to be secured to an article of merchandise, said second part being connected at one end thereof to said second end of said first part;
   - said label or tag being provided on only said second part thereof with a plurality of laterally spaced, side-by-side incisions of substantial length extending generally in the longitudinal direction of said second part and dividing said second part into a number of elongated strips of substantial length;
   - said strips being of sufficient width and length that said second part of said label or tag is securable to an article of merchandise by securing means which applies a lateral constricting force to said strips to cause at least some of the latter to at least partially overlie one another;
   - whereby if one or some of said strips is severed the remaining unsevered one or more of said strips will be effective to keep said label or tag secured to said article of merchandise by said securing means.
2. A label or tag according to claim 1, wherein:
   - said incisions extend out through the end of said second part which is remote from said one end thereof which is connected to said first part.
3. A label or tag according to claim 1, wherein:
   - said first and second parts are integral with one another.

4. A label or tag according to claim 1, wherein: said label or tag is made of paper.

5. A label or tag according to claim 1, wherein: said label or tag is made of paper reinforced with a synthetic foil material.

6. Two labels or tags each constructed according to claim 1, wherein:

said two labels or tags are secured together at their respective ends which are remote from the one ends of said second parts thereof at which they are attached to said first parts thereof.

7. The combination according to claim 6, wherein: said respective pluralities of incisions of the second parts of both labels or tags are aligned with and join with one another.

8. The combination according to claim 6, wherein: said respective pluralities of incisions of the second parts of both labels or tags are aligned with one another.

9. A label or tag according to claim 1, further including:

securing means securing said second part to said article of merchandise, said securing means applying a constricting force to the portion of said second part in which said strips are formed.

10. A label or tag according to claim 9, wherein: said securing means comprises a ring-shaped clip at least partially encircling said second part and clamping it to said article of merchandise.

11. The combination according to claim 1, wherein: there are provided not more than about five of said incisions.

12. The combination according to claim 1, wherein: at least some of said incisions are at least as long as the width of said second part of said strip.

13. The combination according to claim 12, wherein: at least some of said incisions are longer than the width of said second part of said strip.

14. The combination according to claim 1, wherein: said side-by-side incisions are substantially continuous and uninterrupted.

15. The method of use of the tag or label according to claim 1 comprising:

securing said second part of said label or tag to an article of merchandise by securing means which applies a lateral constricting force to said strips to cause at least some of latter to at least partially overlie one another.

16. The method according to claim 15, wherein: said securing means comprises a ring-shaped clip at least partially encircling said second part and clamping it to said article of merchandise.

* * * * *